July 24, 1951  J. BUNYAN  2,561,782
ELECTRIC MOTOR CONTROLLER
Filed April 22, 1947  4 Sheets-Sheet 1
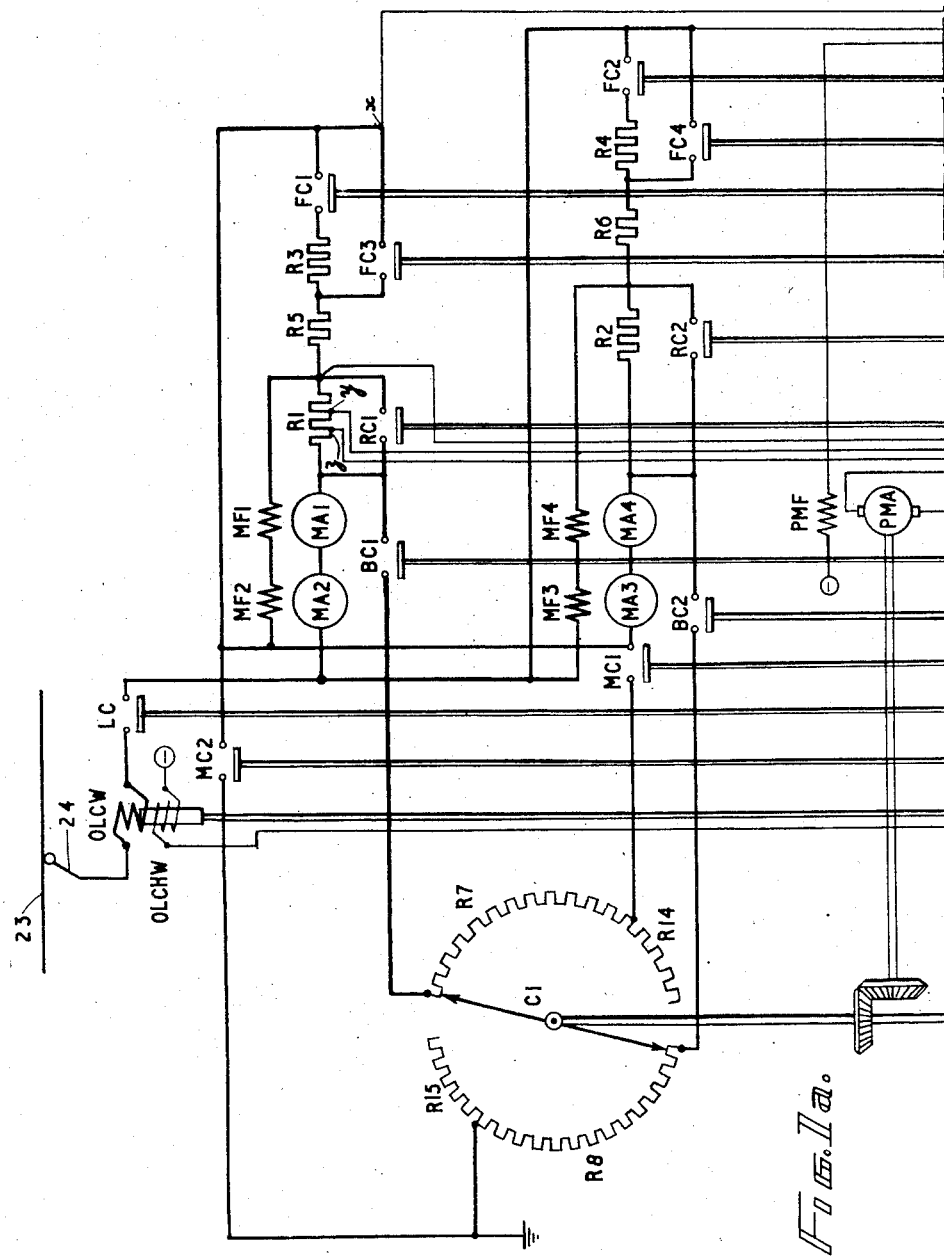
Inventor
J. Bunyan
By John A. Seifert
Attorney July 24, 1951

J. BUNYAN 2,561,782

ELECTRIC MOTOR CONTROLLER

Filed April 22, 1947

Inventor
J. Bunyan
By John A. Seifert
Attorney

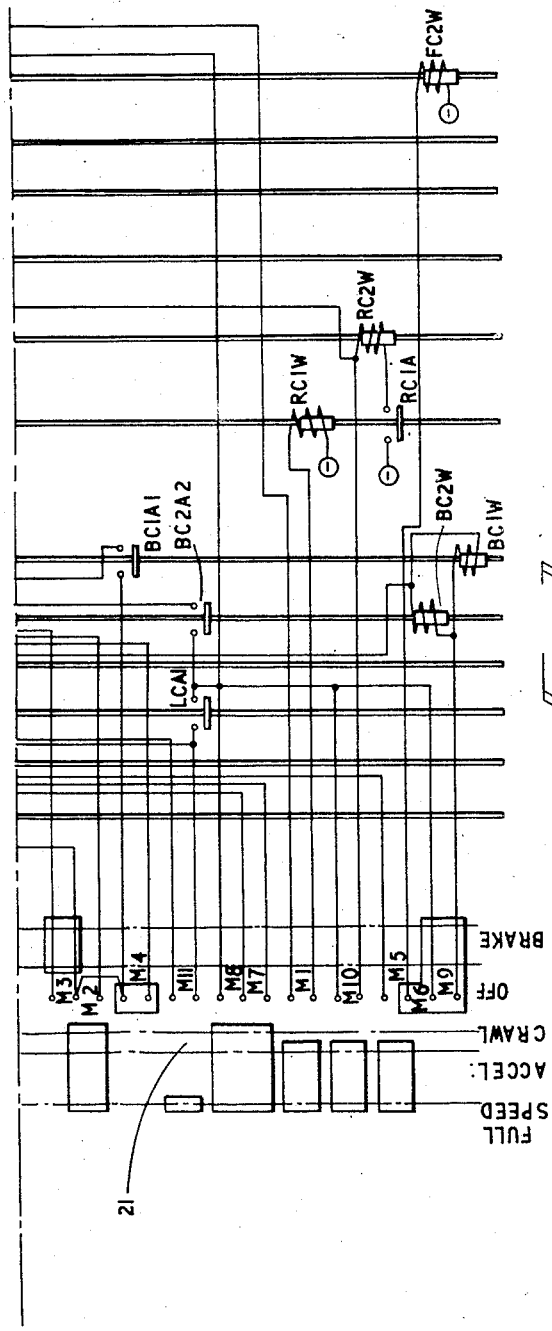

July 24, 1951  J. BUNYAN  2,561,782
ELECTRIC MOTOR CONTROLLER

Filed April 22, 1947  4 Sheets-Sheet 4

Inventor:
J. Bunyan
By John A. Seifert
Attorney

Patented July 24, 1951

2,561,782

UNITED STATES PATENT OFFICE 2,561,782

ELECTRIC MOTOR CONTROLLER

John Bunyan, Brighton, England, assignor to Allen West and Company Limited, Brighton, England, a British company Application April 22, 1947, Serial No. 743,007
In Great Britain April 10, 1946

Section 1, Public Law 690, August 8, 1946
Patent expires April 10, 1966

5 Claims. (Cl. 318—390)

This invention relates to electric motor control systems and refers particularly, but not exclusively, to control systems for the motors of electric vehicles.

The object of the invention is the provision of improvements in such systems, and the invention comprises the arrangement that accelerating resistance is adapted to be cut out of the armature circuit at a rate which is a function jointly of the setting of a master controller and of the current in said armature circuit. In this way substantially constant-current acceleration may be obtained at a current which depends upon the setting of the said master controller.

The invention further comprises the arrangement that braking resistance is adapted to be cut out of a rheostatic braking circuit at a rate which is a function jointly of the setting of a master controller and of the current in said braking circuit. In this way substantially constant-current rheostatic braking may be obtained at a current which depends upon the setting of said master controller.

In order that the invention may be the more clearly understood a control system in accordance therewith for the motors of a tram car will now be described, reference being made to the accompanying drawings, wherein:

Figures 1a, 1b and 1c are diagrams illustrating the circuits of said control system, Figure 1a being one end section of the system, Figure 1b being the intermediate section and Figure 1c being the opposite end section;

Figure 11B:
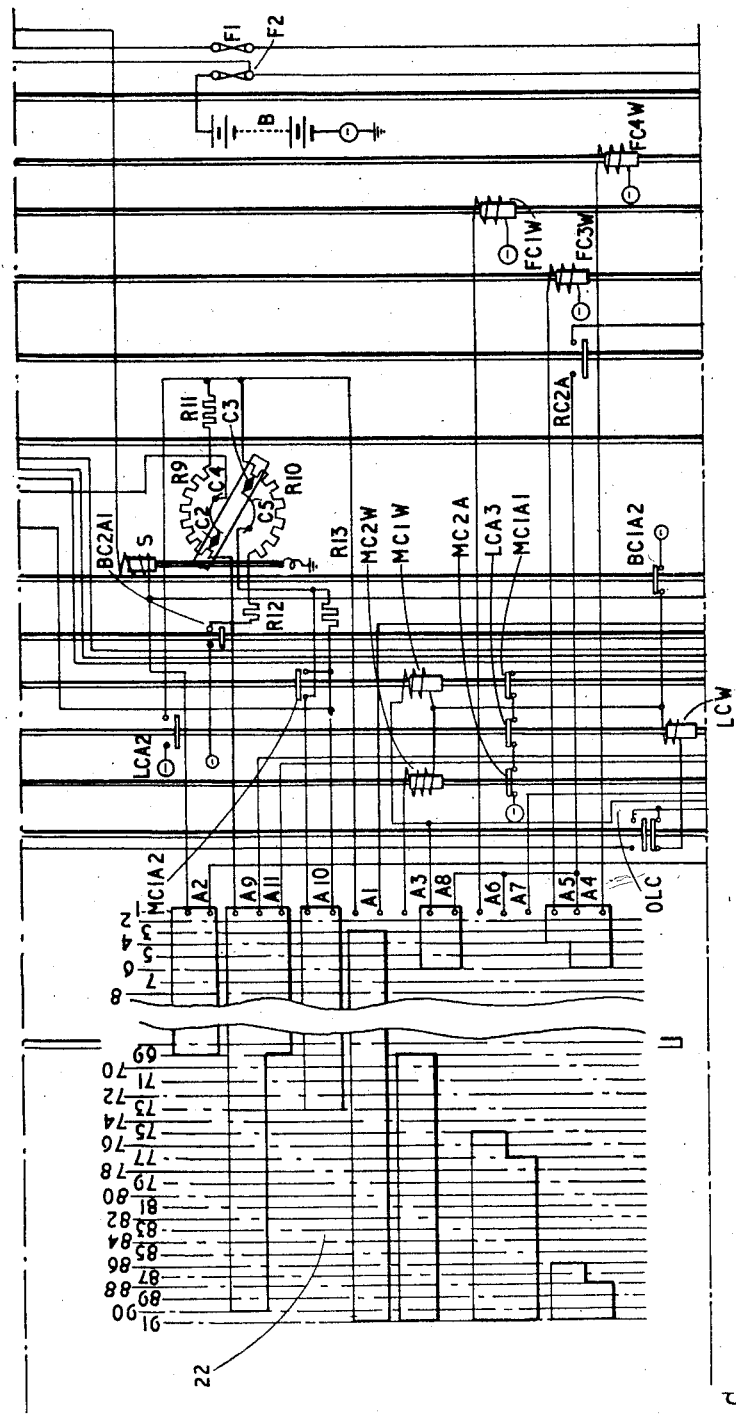

Referring to the drawings the tram car has four driving motors having armatures MA1, MA2, MA3 and MA4 and field windings MF1, MF2, MF3 and F4. The acceleration of said motors is controlled by first progressively cutting out resistance sections R7 and R8 from the armature circuit and then progressively weakening the field energisation. The braking of the motors is effected by progressively cutting out, from a rheostatic braking circuit, first the resistance sections R14, R15 and then the resistance sections R7, R8. The cutting out of said resistance sections R7, R8 for accelerating is effected by rotating in a clockwise direction a bridging contact C1 for said resistance sections. The cutting out of said resistance sections R14, R15 and R7, R8 for braking is effected by rotating the same bridging contact C1 in a counterclockwise direction.

The rotation of the contact C1 both for accelerating and braking is effected by means of a pilot motor PMA, and said pilot motor is energised according to the position of contacts C2, C3 on potentiometer resistances R9, R10.

The position of said contacts C2, C3 on said resistances R9, R10 is determined both by the position of the driver's master control lever 1 and by the armature current of the motors. Thus said control lever 1 has an "off" position, a range of accelerating positions on one side of the "off" position and a range of braking positions on the other side of the "off" position. When said lever 1 is moved to any accelerating position the driving connections for the motors are established and the potentiometer resistances R9, R10 are energised so that the pilot motor PMA drives the contact C1 clockwise for cutting the resistance sections R7, R8 out of the armature circuit and accelerating the motors as aforestated. During this stage the contacts C2, C3 take up a position, and therefore the pilot motor PMA and the contact C1 operate at a speed, which depends on the balance of the opposed forces exerted by a spring 2 and a solenoid S, the spring being stressed according to the position of the lever 1 so that its stress is greater the further advanced is the accelerating position of the lever 1, and the solenoid being energised according to the armature current so that its force in opposition to the spring is greater, the greater is said armature driving current. Consequently, as will be more particularly described hereinafter, for any accelerating position of the lever 1, the contacts C2, C3, and therefore the pilot motor PMA and the contact C1, will be so controlled that the motors will accelerate under approximately constant current conditions, the current being the greater, the further advanced is the lever 1 in the accelerating direction.

When said lever 1 is moved to any braking position the rheostatic braking connections for the motor are established and the potentiometer resistances R9, R10 are energised so that the pilot motor PMA drives the contact C1 counterclockwise for cutting the resistance sections R14, R15, R7, R8 out of the dynamic braking circuit and retarding the motors. As in the accelerating stage, the contacts C2, C3 during this braking stage take up a position and therefore the pilot motor PMA and the contact C1 operate at a speed, which depends on the balance of the forces exerted by the spring 2 and solenoid S, the spring stress being the greater, the further advanced is the braking position of the lever 1, and the solenoid force being the greater, the greater is the armature braking current. Therefore for any braking position of the lever 1 the contact C1 will be so controlled that the motors will decelerate under approximately constant current rheostatic braking conditions, the braking current being the greater the further advanced is the lever 1 in the braking direction.

Between the "off" position and the acceleration positions of the lever 1 there is a "crawl" position. At this position the circuit conditions are in general the same as in the accelerating positions but the arrangement is such that the rate of acceleration is low and that the motors will never accelerate beyond the speed determined by the retention of resistances R1 and R2 in circuit.

When the lever is returned to the "off" position from an accelerating position circuit conditions are established which are in general the same as at the braking positions, but the arrangement is such that the rate of retardation is negligible so that the motors will continue to coast.

Figure 2:
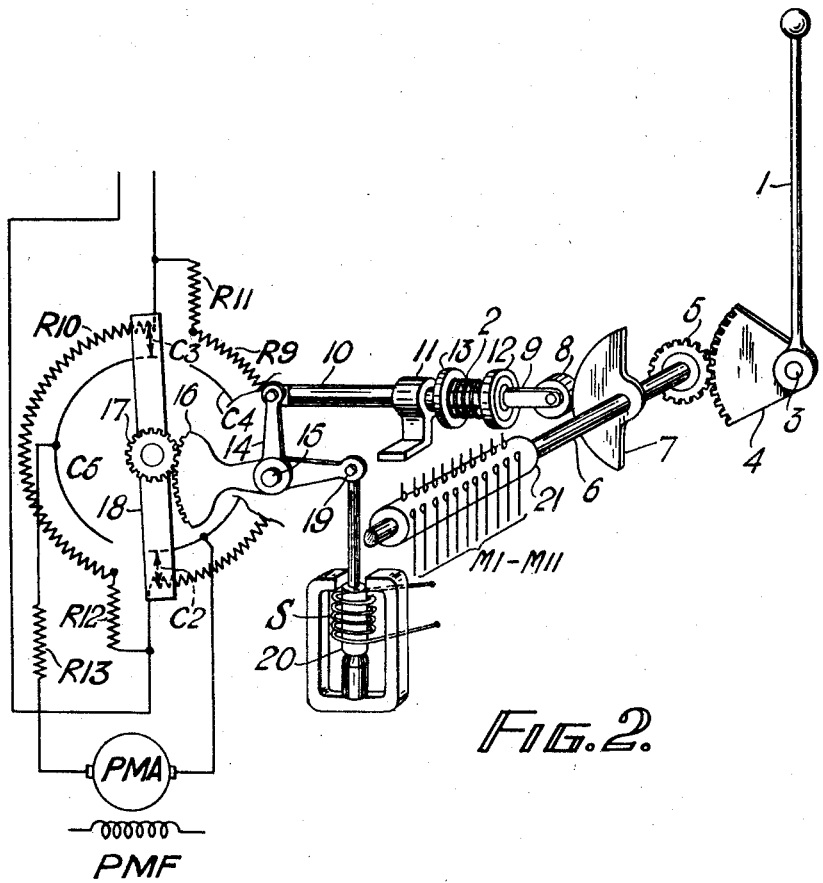
Figure 2 is a somewhat schematic part perspective view illustrating certain mechanically co-operating parts and their correlation with the circuits of Figure 1.

Describing now with reference to Figure 2 the mechanical correlation between the lever 1, the core of the solenoid S and the contacts C2, C3, said lever rotates about a pivot point 3 and is rigid with a toothed quadrant 4. Said quadrant is in mesh with a pinion 5 which is fast on a rotatable shaft 6 which has a cam 7 rigidly mounted on it. The cam surface of said cam 7 engages a roller 8 mounted on one end of a rod 9 whose other end telescopes in one end of a coaxial rod 10 which bears in a bearing 11. The two rods 9 and 10 are biased axially away from each other by means of the spring 2 which is a coil spring and is in compression between flanges 12 and 13 which are rigid on said two rods respectively. The far end of said rod 10 is in compression and is pivotally connected to the end of an arm 14 which is fast on a short rotatable shaft 15. A toothed quadrant 16 is also fast on said shaft 15, and said quadrant is in mesh with a pinion 17 which rotates about a fixed axis and is rigid with an arm 18 which intersects said axis, and said arm at its two ends carries the contacts C2, C3. As the pinion 17, and therefore the arm 18, rotates, the contacts C2, C3 move over the potentiometer resistances R9, R10. As will be clear from the drawing, said contacts C2, C3 are permanently connected to the terminals of the pilot motor armature PMA through arcuate contacts C4, C5 along which said contacts C2, C3 move.

Another arm 19 is fast on the shaft 15 and this arm 19 is connected to the core 20 of the aforesaid solenoid S.

It will be observed that a thrust is transmitted from the cam surface, through the roller 8, the rod 9, the spring 2 and the rod 10 to the arm 14, and this thrust tends to rotate the shaft 15 and quadrant 16 in such a direction as to bring the arm 18 to the position illustrated, at which position the pilot motor has substantially the maximum potential applied to its terminals. The cam 7 is so formed that when the arm 1 is at the "off" position the roller is pressed least far in the direction towards the arm 14 and the spring 2 tends to be least compressed, and the further said lever 1 is moved from the "off" position in either the accelerating or the braking direction, the further will said roller 8 be pressed towards said arm 14, and the more will the spring 2 tend to be compressed.

On the other hand when the solenoid S is energised, the core 20 pulls the arm 19 so as to tend to rotate the shaft 15 and quadrant 16 in the direction to bring the arm 18 away from the position illustrated. When the lever 1 is at the "off" position with the motors at rest, the solenoid S will be de-energised, and even the weak compression of the spring 2 at this position of the lever is therefore sufficient to move the contacts to the position illustrated. At the crawl and accelerating positions of the lever 1, and also at the "off" and brake positions when the motors are running, the solenoid S will be energised in accordance with the armature current, and the contacts C2, C3 will, as heretofore stated, take up a position which depends on the balance of the forces exerted by the spring 2 and solenoid S. The potentiometer resistances R9, R10 will also be energised and therefore the pilot motor PMA will drive the contact C1 at a speed depending on the armature current and the setting of the lever 1. All this will be more particularly described hereinafter.

The shaft 6 also carries a drum 21 which controls a number of contacts M1 to M11. The contacts, which are shown in detail in Figure 1, are operated according to the position of the lever 1 as follows: M4 and M6 close at the "off" position of the lever; M9 closes at the "off" position and also at all the brake positions of the lever; M1, M5 and M10 close at all the accelerating positions of the lever; M2, M7 and M8 close at all the accelerating positions and also at the crawl position of the lever; M11 closes at the furthest advanced accelerating position of the lever, termed the full speed position; M3 closes at all the brake positions of the lever.

Also there is a second drum 22 which controls a plurality of contacts A1 to A11 so that they close according to the position of the accelerating contact C1. In the course of its travel from the starting position to its position to the extremity of the resistances R14, R15, said contact C1 has ninety-one positions. Position "1" is the starting position illustrated. Position "70" is the position at the junction of the resistances R7, R8 on the one hand with resistances R14, R15 on the other. Position "91" is the last position at the extremity of the resistances R14, R15. Said contacts A1 to A11 are operated according to the position of said contacts C1 as follows: Contact A1 is closed at all positions between "3" and "91"; contact A2 is closed at all positions between "1" and "70"; contact A3 is closed at all positions between "70" and "91"; contact A4 is closed at all positions between "1" and "6" and between "88" and "91"; contact A5 is closed at all positions between "1" and "4" and between "86" and "91"; contact A6 is closed at all positions between "76" and "91"; contact A7 is closed at all positions between "78" and "91"; contact A8 is closed at all positions between "1" and "6"; contact A9 is closed at all positions between "1" and "90"; contact A10 is closed at all positions between "1" and "74"; contact A11 is closed at all positions between "1" and "70."

In addition the control gear comprises the following contactors: A line contactor LC having a winding LCW, normally open auxiliary contacts LCA1 and LCA2, and normally closed auxiliary contacts LCA3. Resistance controlling contacts RC1 and RC2 have respective windings RC1W and RC2W and respective normally open auxiliary contacts RC1A and RC2A. Field diverter contactors FC1, FC2, FC3 and FC4 having respective windings FC1W, FC2W, FC3W and FC4W. Braking contactors BC1, BC2 having respective windings BC1W and BC2W, the contactor BC1 having normal open auxiliary contacts BC1A1 and normally closed auxiliary contacts BC1A2, and the contactor BC2 having normally open auxiliary contacts BC2A1 and BC2A2. Main contactors MC1, MC2 having respective windings MC1W and MC2W, the contactor MC1 having normally closed auxiliary contacts MC1A1 and MC1A2, and the contactor MC2 having normally closed auxiliary contacts MC2A. An overload contactor OLC having an overload winding OLCW and a hold-on winding OLCHW for holding it open.

The references R1, R2 designate additional armature circuit resistances; the references R3, R4, R5, R6 field winding diverter resistances; the references R11, R12 additional resistances in circuit with the potentiometer resistances and resistance R13 a resistance in the pilot motor circuit. The references F1 and F2 designate fuses.

A battery B is provided for energising the various control circuits. The circuit connections are clear from Figure 1.

Describing now the operation of the system in detail, the first movement of the master control lever 1 away from the "off" position in the accelerating direction effects closure of the contacts M7 and M8. Circuit is accordingly established, from the upper terminal of battery B, through fuse F2, through contacts M8, through normally closed overload relay contacts OLC, through winding LCW of line contactor LC and through normally closed auxiliary contacts BC1A2 on brake contactor contacts BC1 to the ground. Line contactor LC accordingly closes its contacts.

Circuit is also established from the upper terminal of battery, through fuse F2, through contacts M8 and M7, through winding MC1W of main contactor MC1 and through said auxiliary contacts BC1A2 to the ground. Main contactor MC1 accordingly closes its contacts.

At this stage also, owing to the moving bridging contact C1 of the accelerator being at the starting position illustrated (i. e. position "1"), contacts A4, A5 and A8 are closed, and circuit is accordingly established, from the upper terminal of battery B to contact M7 as heretofore described, and thence through contacts A8, and, by two parallel circuits, one through contacts A4 and winding FC4W of contactor FC4, and the other through contacts A5 and winding FC3W of contactor FC3, to the ground. Contactors FC3 and FC4 accordingly close.

It will be seen that the motors are connected in series parallel with full resistance in circuit and that the fields are weakened by diverter resistance circuits. Thus the motor circuits may be traced from overhead line 23, through trolley arm 24, through overload winding OLCW, line contactor LC, motor armatures MA2, MA1, resistance R1, motor field windings MF1, MF2, main contactor MC1, resistance R7, contact C1, and resistance R8 to earth. Circuit for the other two motors extends from contactor LC, through field windings MF3, MF4, resistance R2, motor armatures MA4, MA3, main contactor MC1 and from there as previously traced through resistances R7 and R8 to earth.

Also the field windings MF2, MF1 are weakened by being paralleled by diverter resistance R5 through contactor FC3, and the field windings MF4, MF3 are weakened by being paralled by diverter resistance R6 through contactor FC4.

The four main motors will accordingly start dead slow.

At the same time a circuit is established energising the solenoid S, said circuit extending from the point $x$ through said solenoid S, the contacts A2, the contacts M2 to the point $y$. This circuit accordingly parallels the field windings MF1, MF2 and the right hand part of the resistance R1 and the solenoid S is therefore energised with a current which varies in accordance with the armature current. Since the contact A2 is closed for all positions of the bridging contact C1 from 1 to 70, and the contact M2 is closed for all positions of the control lever 1 during starting and accelerating, this energising circuit for the solenoid will remain established until the bridging contact C1 reaches the position 70 at which the contactor MC1 is connected directly to earth.

The solenoid S being thus energised exerts a force tending to move the potentiometer contacts C2, C3 away from the position illustrated. This force will be opposed by the force exerted by the spring 2, but at the first starting or crawl position of the lever 1, the force exerted by said spring will be very light and the solenoid will prevail and the contacts C2, C3 will be moved away from the position illustrated.

It will be seen that a potentiometer circuit is established from the upper terminal of the battery B, through the auxiliary contacts LCA1 of the line contactor LC, contacts A11, A9, thence through two parallel paths, one by way of resistances R9 and R11 and the other by way of resistances R12 and R10, to auxiliary contacts LCA2 of line contactor LC, and thence to the ground. The pilot motor armature is connected directly between contacts C2 and C3, resistance R13 being short circuited through contacts A10, and therefore has a potential difference across its terminals depending on the position of said contacts C2 and C3. At the position illustrated, and with the potentiometer circuit as just described, this potential difference is the maximum in the direction for causing the pilot motor to drive the bridging contact C1 clockwise, that is in the direction for cutting out resistance R7 and R8 from the circuit of the main motors. The solenoid S has however, moved said contacts C2, C3 away from said position illustrated, to such an extent that the pilot motor PMA has only a small potential across its terminals for moving said bridging contactor in the said direction and and therefore the bridging contactor C1 will move only slowly away from the starting position illustrated, and the resistance in circuit with the main motors will be reduced and said motors will tend to gather speed.

When the bridging contactor C1 has reached position 4 contact A5 opens, and winding FC3W is de-energised and contactor FC3 opens, thereby interrupting the diverter circuit for field windings MF2, MF1. When bridging contactor C1 has reached position 6, contact A4 also opens de-energising winding FC4W and opening contactor FC4, and thereby de-energising the diverter circuit for field windings MF3, MF4.

All fields are now at full strength and the resistances R1 and R2 are in the motor circuits. The force exerted by the solenoid S will now be sufficient to keep the contacts C2 and C3 at, or sufficiently near to, the zero potential position, so that the contact C1 will only advance very slowly and the motors will continue to accelerate very slowly.

When the lever 1 is now further moved from the crawl position to anywhere within the range of the accelerating positions, the contacts M1 and M10 close. Closure of contacts M1 effects energisation of winding RC1W of contactor RC1, by way of a circuit extending from overload winding OLCW, through line contactor LC, fuse F1, through said contacts M1 and said winding RC1W to ground. Contactor RC1 accordingly closes, thereby cutting out resistance R1 from the motor circuit.

Contactor RC1 on closing closes its auxiliary contacts RC1A and circuit is accordingly established through contacts M10, winding RC2W of contactor RC2 and said auxiliary contacts RC1A. Contactor RC2 therefore closes cutting out resistance R2.

Resistances R1 and R2 are now cut out of the motor circuits and the motors will commence to speed up. Also owing to the increased stress on the spring 2 occasioned by the lever 1 being moved into the accelerating range, there will be a greater force tending to move the potentiometer contacts C2, C3 in the direction for increasing the potential applied to the pilot motor in the direction for moving the bridging contact C1 in the accelerating direction. At the same time, closure of contactor RC1 will tend to reduce the energisation of the solenoid S opposing said spring. The bridging contact C1 will therefore move in the accelerating direction thereby progressively cutting out resistances R7 and R8 and speeding up the motor.

The situation now is that, so long as the lever 1 is anywhere within the accelerating range, the bridging contactor C1 will, generally speaking, continue to move in the accelerating direction. This is because the spring 2 will, generally speaking, prevail over the solenoid S sufficiently to bring the contacts C2 and C3 to a position for driving the pilot motor PMA for moving the bridging contact C1 in the accelerating direction. The further said lever 1 is moved into the accelerating range, the greater will be the force exerted by the spring 2, the further will the contacts C2, C3 tend to be moved in the direction for increasing the forward potential supplied to the pilot motor PMA, and thereby increasing the speed at which the bridging contact moves in the accelerating direction.

On the other hand, the energisation of, and therefore the force exerted by, the solenoid S in opposition to that exerted by the spring 2, will be greater or less according as the armature current of the motors is greater or less, and therefore the greater the armature current the further will the contacts C2, C3 tend to be moved in the direction for reducing the forward potential supplied to the pilot motor and the slower will the accelerating movement of the bridging contact C1 tend to be. Thus at all accelerating positions of the lever 1 the bridging contact will move in the accelerating direction at a speed which will depend on a balance of the lever setting and the armature current, being greater according as the lever is more advanced and less according as armature current is greater. It is possible, especially when the lever 1 is set for the lowest rates of acceleration that a rise in armature current, caused say by a hill, might cause the potentiometer contacts C2, C3 to take up a position which would supply the pilot motor PMA with reverse potential so that the contact C1 would move temporarily in the decelerating direction, but, in general, for all accelerating positions of the lever 1, the contact C1 will move in the accelerating direction.

It will be observed that, during this stage the condition is that of acceleration at an armature current which depends on the position of the control lever 1, being greater or less according as said lever is further or less far advanced into the accelerating range. Said armature current will be approximately constant for any given setting of the lever 1 and the condition will then be that of constant current acceleration.

When the contact C1 reaches position 70 (i. e. when all the resistance R7 and R8 is cut out and the main contactor MC1 is connected direct to earth), the contact A2 opens and the solenoid S is de-energised. The spring 2, now unopposed, accordingly returns the contacts C2 and C3 to the position illustrated where the pilot motor PMA is adapted to be subjected to the maximum forward potential. At the same time, however, the contacts A11 open and therefore, if the lever 1 is at other than the full accelerating position, the supply circuit to the potentiometer windings R9 and R10 will be interrupted and the pilot motor de-energised, so that the contact C1 will remain at position 70. If however the lever is at the full accelerating position the contact M11 will be closed short circuiting the contacts A11 and the pilot motor PMA, under maximum forward potential, will continue to drive the contact C1 clockwise according to the drawing. Also, when the contact C1 reaches position 70 contact A3 will close and therefore the winding MC2W will be energised in parallel with the winding MC1W and the contactor MC2 will close, thereby completing the motor circuits independently of the contact C1 and preventing resistances R14, R15 from being introduced into the armature circuit as said contact C1 continues to move to the right.

Assuming that the lever 1 is at the full accelerating position and the contact C1 moves still further to the right, when said contact passes position 74, contact A10 opens thereby introducing resistance R13 into the circuit of the pilot motor PMA and keeping the speed of said pilot motor down to a suitable value.

When the contact C1 reaches position 76, contact A6 closes and thereby establishes an energising circuit for the winding FC1W, said circuit extending from the upper terminal of battery B, through contact M10, contact RC2A (contactor RC2 being closed), said contact A6 and said winding FC1W to the ground. Contactor FC1 accordingly closes and introduces resistances R5, R3 in series in a diverter circuit in parallel with field windings MF1, MF2. Said field windings are accordingly weakened and the motor speed is increased.

When contact C1 reaches position 78, contact A7 closes and thereby establishes an energising circuit for winding FC2W, said circuit extending to contact RC2A as previously traced, and thence through contacts A7, M5, and said winding FC2W to the ground. Contactor FC2 accordingly closes and introduces resistances R4 and R6 in series in a diverter circuit in parallel with field windings MF3, MF4. Said field windings are accordingly weakened and the motor speed is further increased.

When contact C1 reaches position 86 contact A5 closes and an energising circuit for winding FC3W is established in parallel with winding FC1W. Contactor FC3 accordingly closes, short circuiting resistance R3 and further weakening the fields MF1, MF2. The motor speed is therefore still further increased.

When contact C1 reaches position 88, contact A4 closes and thereby establishes an energising circuit for winding FC4W in parallel with winding FC3W. Contactor FC4 accordingly closes, short circuiting resistance R4 and further weakening the fields MF3, MF4 and increasing the motor speed.

The motors are now running at full speed.

When the contact C1 passes position 90, contact A9 opens, and thereby interrupts the circuit of the potentiometer windings R9, R10. The pilot motor is accordingly de-energised and stops, but it runs by inertia far enough to carry the contact C1 to the final position 91.

If now, with the motors running at full speed, the lever 1 is returned to the "off" position, the contactors LC, MC1, MC2, RC1, RC2, FC1, FC3 and FC4 all drop out. Owing, however, to closure of contacts M6 at the "off" position, the winding FC2W remains energised and the contactor FC2 accordingly remains closed, and the diverter resistances R4 and R6 are connected in shunt with the motor fields MF3, MF4.

Also, owing to closure of contacts M9 at the "off" position, energising circuits are established for windings BC1W and BC2W. Contactors BC1 and BC2 accordingly close and two dynamic braking circuits are established. One of these dynamic braking circuits extends through the armatures MA1, MA2 and the fields MF3, MF4, said circuit extending from the left hand terminal of the armature MA2 through fields MF3, MF4, resistance R2, Contactor BC2, resistances R8, R15, contact C1, resistances R14, R7, contactor BC1 to the right hand terminal of the armature MA1. The other dynamic braking circuit is established through armatures MA3, MA4 and fields MF1, MF2, said circuit extending from the left hand terminal of armature MA3, through fields MF2, MF1, resistance R1, contactor BC1, as before through resistances R7, R14, R15, R8 and contactor BC2 to right hand terminal of armature MA4.

At the same time, owing to closure of auxiliary contacts BC2A1 and BC2A2 on the contactor BC2, the potentiometer resistances R9, R10 are again connected across the battery B by a circuit extending from the upper terminal of said battery, said contacts BC2A2, contact A1, resistances R10, R12 and R11, R9 in parallel, and said contacts BC2A1 to the ground.

It will be observed that the resistances R9, R10 are now connected across the battery B in the opposite direction to the previous direction, and therefore the pilot motor will now be driven in the reverse direction. Owing to the closure of normally closed contacts MC1A2 on contactor MC1, resistance R13 is short circuited.

The lever 1 being at the "off" position, contact M4 is closed and a circuit for energising the solenoid S is now established from point $x$, through said solenoid S, normally open contacts BC1A1 on contactor BC1, said contact M4 to the point $z$ on the resistance R1.

It will now be seen that the spring 2, which, the lever 1 being at the "off" position, is weakly stressed, will again be opposed by the solenoid, so that, the greater the dynamic braking current, the slower will the pilot motor be driven in the reverse direction.

The pilot motor will now therefore be driven, at a speed depending inversely on the dynamic braking current so as to move contact C1 counterclockwise and the resistances, first R14 and R15 and then R7 and R8 will be progressively cut out and the motors will be slowed down.

In other words, as each increase in the dynamic braking current results in a slow-down of the contact C1 and vice versa, the condition is that the motors are being retarded under a substantially constant dynamic braking current. As the solenoid S is connected across the field windings MF1, MF2 plus substantially the whole of the resistance R1, the energisation of said solenoid in relation to the dynamic braking current is relatively high, and as, moreover, the stress of the spring 2, the lever 1 being at the "off" position, is weak, the solenoid S will prevail over the spring 2 for even weak braking current sufficiently to maintain the contacts C2 and C3 at positions for energising the pilot motor PMA weakly. The counterclockwise movement of the contact C1 in the braking direction will therefore tend to be slow, and the approximately constant dynamic braking current will be weak. This fact together with the fact that, as above described, the motor fields MF3, MF4 are shunted by the resistances R4, R6, results in the retarding effect being so feeble that the vehicle will substantially coast and will come to rest only very slowly.

When the contact C1 passes position 3 contact A1 opens and interrupts the energising circuit of the potentiometer resistances R9, R10. The pilot motor PMA is accordingly de-energised but it will rotate by inertia sufficiently far to carry the contact C1 back to position 1. At this stage mechanical braking is applied.

If with the motors running, say, at full speed the lever 1 is returned beyond the "off" position into the braking range, the contactors LC, MC1, MC2, RC1, RC2, FC1, FC3 and FC4 will drop out as at the "off" position, and, in addition the contactor FC2 will also drop out as the contact M6 which is closed only at the "off" position will now be open. Therefore there will be no diverter resistance across any of the motor fields.

Also, as in the case of the "off" position, contacts M9 will be closed and therefore the aforedescribed dynamic braking circuits and the afore-described reverse potentiometer circuits will be established.

The lever 1 being, however, in the range of braking position and not at the "off" position, contact M3 is closed instead of contact M4, and consequently the solenoid S is connected across the field windings MF1, MF2 only and not the resistance R1.

Also the lever 1 being in the range of braking positions the spring 2 is more stressed than when said lever was at the "off" position.

The fact that there is no diverter resistance across any of the field windings tends to increase the braking effect. The fact that the solenoid S is connected only across the field windings MF1, MF2 also tends to increase the braking effect, since it involves a stronger braking current being required to provide a given energisation of said solenoid for slowing down the pilot motor PMA. The fact that the spring 2 is more stressed also tends to increase the braking effect since it increases the tendency to speed up the pilot motor PMA. It will thus be seen that, when the lever 1 is anywhere within the range of braking positions the braking effect exercised by the dynamic braking circuits is much greater than when said lever is at the "off" position.

Also, the further the lever 1 is moved in the braking direction beyond the "off" position, the more will the spring 2 be stressed and the greater will be the braking effect. The condition is now analogous to that during acceleration inasmuch as, for any braking position of the lever 1 a state of approximately constant current dynamic braking is achieved, the current being the greater the further the lever is advanced in the braking direction.

As in the case of the "off" position the pilot motor is de-energised when the contact C1 passes position 3, and thereafter mechanical braking is employed.

Although, as aforestated the braking effort when the lever 1 is at the "off" position is negligible or very small, the contact C1 moves slowly clockwise in such a way that as soon as the lever is moved to a braking position the correct resistance will be in circuit to give smooth transition.

It will be observed that not only is the same potentiometer employed for driving the pilot motor in opposite directions for accelerating or rheostatic braking, but the same accelerator contact moves over the same armature resistance for accelerating and dynamic braking.

I claim:

1. An electric motor control system, comprising an electric motor, resistance, means for connecting said resistance in a circuit of said motor, a pilot motor for progressively cutting said resistance out of said circuit, a floating control element movable throughout a given range, means whereby the speed of said pilot motor progressively varies in accordance with the progressive variation of the position of said floating control element throughout said range, a master controller, current sensitive means subject to the influence of the current in said circuit, and means whereby the position of said floating control element throughout said range depends jointly on the setting of said master controller and on said current-sensitive means.

2. An electric motor control system, comprising an electric motor, resistance, means for connecting said resistance in a circuit of said motor, a pilot motor for progressively cutting said resistance out of said circuit, a potentiometer through the medium of which said pilot motor is energized, said potentiometer having a control element whose setting determines the speed of said pilot motor, a master controller, current sensitive means subject to the influence of the current in said circuit, and means whereby the setting of said control element depends jointly upon the setting of said master controller and upon the value of the current in said circuit.

3. An electric control system, comprising an electric motor, resistance, means for connecting said resistance in a circuit of said motor, a pilot motor for progressively cutting said resistance out of said circuit, two contacts connected respectively to the terminals of said pilot motor, two potentiometer resistances connected in parallel across a source of potential, a potentiometer control element, said contacts being mounted on said potentiometer control element and being adapted, in response to unidirectional movement of said potentiometer control element to move in opposite directions over said potentiometer resistances and thereby vary the potential applied to said pilot motor, a master controller, current sensitive means subject to the influence of the current in said circuit, and means whereby the setting of said control element depends jointly upon the setting of said master controller and upon the response of said current sensitive means.

4. An electric motor control system, comprising an electric motor, resistance, means for connecting said resistance in a circuit of said motor, means for progressively cutting said resistance out of said circuit, a floating control element movable throughout a given range, means whereby the rate at which said last-named means cut said resistance out of said circuit progressively varies in accordance with the progressive variation of the position of said floating control element throughout said range, a master controller, a resilient element which is stressed according to the setting of said master controller, current-sensitive means subject to the influence of the current in said circuit, said current-sensitive means comprising a part which is urged with a force depending upon the value of said current, and means whereby said floating control element is acted upon by said resilient element and said part in opposition, so that it takes up a position in said range at which said part and said resilient element balance one another.

5. An electric motor control system, comprising an electric motor, resistance, means for connecting said resistance in a circuit of said motor, means for progressively cutting said resistance out of said circuit, a floating control element movable throughout a given range, means whereby the rate at which said last-named means cut said resistance out of said circuit progressively varies in accordance with the progressive variation of the position of said floating control element throughout said range, a master controller, a resilient element which is stressed according to the setting of said master controller, a winding connected across part of said circuit, an armature which is attracted by said winding with a force dependent on the current therein, and means whereby said floating control element is acted upon by said resilient element and said armature in opposition, so that it takes up a position in said range at which said armature and said resilient element balance one another.

JOHN BUNYAN.

REFERENCES CITED

The following references are of record in the file of this patent:

UNITED STATES PATENTS

| Number | Name | Date |
|---|---|---|
| 622,369 | Hutchinson | Apr. 4, 1899 |
| 789,754 | Napier | May 16, 1905 |
| 1,383,081 | Dey | June 28, 1921 |
| 1,960,060 | McNairy | May 22, 1934 |
| 2,044,149 | Brooks | June 16, 1936 |
| 2,078,649 | Willby | Apr. 27, 1937 |
| 2,078,684 | Riley | Apr. 27, 1937 |
| 2,114,196 | Tritle et al. | Apr. 12, 1938 |
| 2,318,530 | Purifoy | May 4, 1943 |
| 2,376,599 | Jones | May 22, 1945 |